Patented May 13, 1924.

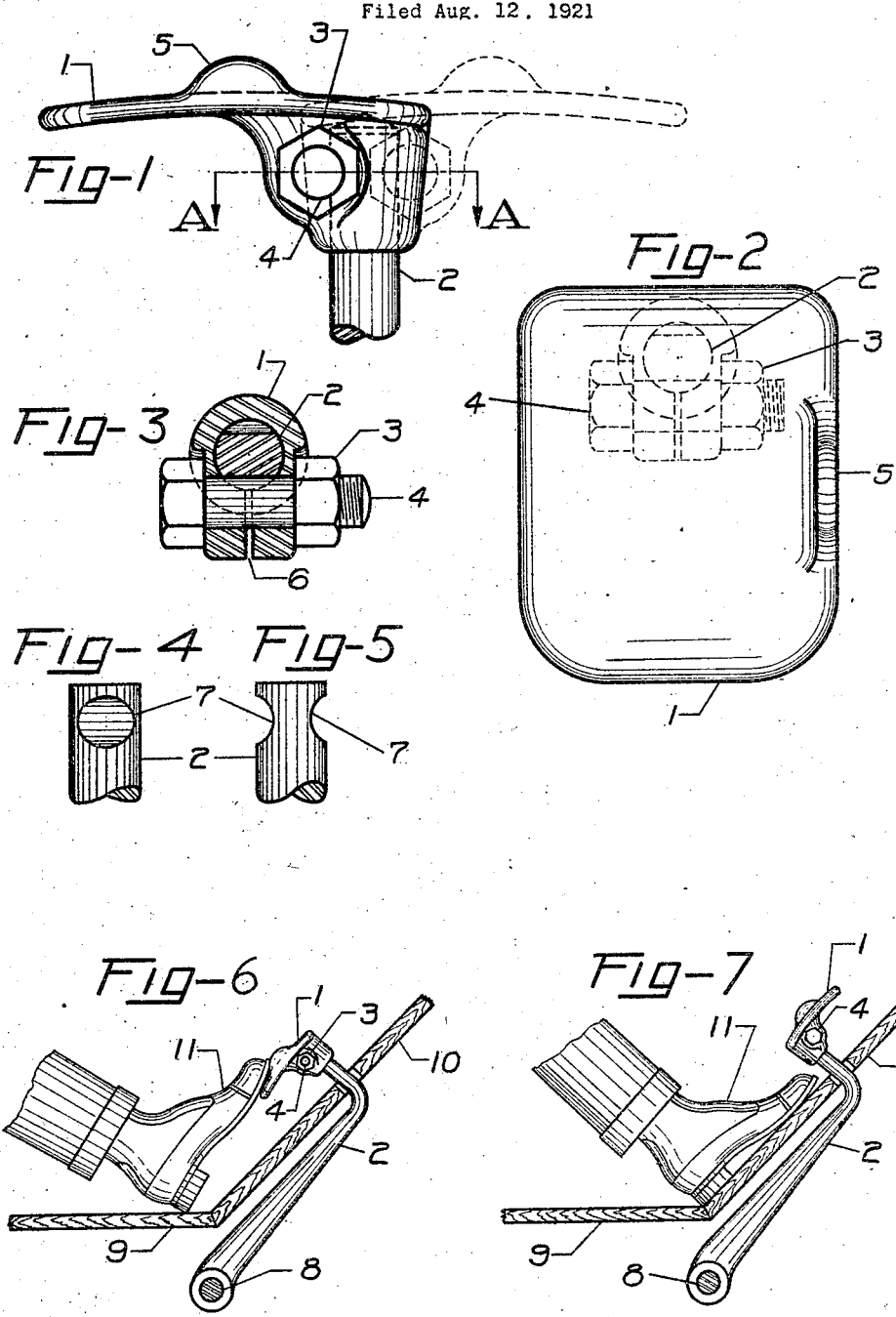

1,493,761

UNITED STATES PATENT OFFICE.

VINCENT LINK, OF DETROIT, MICHIGAN, ASSIGNOR TO STUDEBAKER CORPORATION, A CORPORATION OF NEW JERSEY.

AUTOMOBILE PEDAL PAD.

Application filed August 12, 1921. Serial No. 491,782.

*To all whom it may concern:*

Be it known that I, VINCENT LINK, a citizen of the United States of America, and resident of Detroit, in the county of Wayne and State of Michigan, have invented certain new and useful Improvements in Automobile Pedal Pads, of which the following is a specification.

This invention relates to pedals for operating clutches, brakes, and the like, and has for its object to provide a pedal pad, which can be adjusted on the pedal arm.

A further object is to provide a pedal pad which can be secured to the pedal arm in a position convenient for driving in traffic, or for a short person, and which can be adjusted to a different position more convenient for country driving, or for a taller person.

These objects, together with other objects, and objects relating to details of manufacture and construction will definitely appear from the detailed description to follow.

The usual manner of applying a pedal pad to the pedal is either to cast or forge the same integrally with the foot lever, or if they are separate parts, to fasten them together in such manner that there is only one position laterally in which they are readily adaptable. This position is usually such that when the toe of the shoe rests on the pedal pad, the heel rests on the horizontal portion of the floor in such a position that action is readily obtainable, such as is necessary for driving in city traffic. However, for country driving, where clutch and brake action can usually be foreseen some time in advance of the necessary operation, and where there is relatively little use of the pedals as compared with driving in city traffic, this position of the foot, with the toe of the shoe on the pedal pad, and the heel on the floor, becomes very tiresome. If the driver can brace his feet flat on the inclined part of the floor under the dash his position is much more comfortable and far less tedious. With the customary construction, he may position his foot to one side of the pedal as described, providing there is sufficient room, but not directly in line with the same, due to the fact that the pedal is so designed that when the toe of the shoe rests upon the pedal pad the heel rests upon the horizontal portion of the floor, because the distance from the lower edge of the pedal pad to the junction of the horizontal and inclined portions of the floor is less than the length of the driver's shoe.

The present invention comprises a pedal pad which can be turned to, and locked in, two different positions, one of which is particularly adapted for city driving, and allows the toe of the shoe to rest upon the pedal pad when the heel rests upon the horizontal portion of the floor, and the other, suitable for country driving, which allows the driver to place his foot flat on the inclined portion of the floor directly in line with the pedal. It will readily be seen that the position of the pedals for country driving is not suitable for city driving, as this necessitates the use of the pedal as a foot rest, in order to obtain prompt pedal operation, with resulting wear on the clutch releasing mechanism. These two positions are preferably obtained by making the pedal pad rotatable on the co-acting end of the pedal.

The accompanying drawing illustrates one practical embodiment of the invention, but it will be understood that the construction shown therein is illustrative, only, since the invention may partake of numerous practical embodiments.

Figure 1 is a side elevation of the pedal pad,

Figure 2 is a plan view of the pedal pad,

Figure 3 is a sectional view through the pedal pad boss on the line A—A of Fig. 1, showing the manner of locking the pedal pad to the pedal stem, Figures 4 and 5 are views of the end or stem of the pedal fitting into the pedal pad boss, and Figures 6 and 7 are sections through the floor boards of an automobile showing the pedal pad in two different positions, and the positions in which the driver may place his foot for city and country driving, respectively.

Referring to the drawings, 1 is the pedal pad embodying the present invention, 2 is a pedal arm or part thereof, 3 a nut acting in conjunction with the bolt 4 to lock the pedal pad to the pedal, 5 a lug on the pedal pad to prevent the foot from slipping off the edge, 6 a slot which splits the boss at one side of the opening in the boss into which the pedal stem 2 fits, thereby allowing the bolt 4 and nut 3 to draw the boss up tight on the pedal stem 2. The numerals 7 indicate milled notches in the pedal stem 2, which allow the bolt to pass through the pedal arm pad boss when the pedal stem is inserted therein, for locking the pedal pad against rotatable or axial movement, 8 is the shaft acting as a pivot point for the pedal 2, 9 the horizontal floor board, 10 an inclined floor board, and 11 the driver's foot.

In Figure 1 is shown the overhanging or offset construction of the pedal pad, and also in dotted lines, the result of turning the pad through an arc of 180°.

Figure 3 shows the bolt 4 passing through the slotted pedal pad boss, and intersecting the surface of the boss hole and being allowed to pass through the hole by having the notch 7 shown in Figures 4 and 5 cut in the pedal stem. It will be manifest from this illustration that when the bolt is inserted as shown no rotatable or axial movement of the pedal pad 1 can occur.

Referring to Figure 6, it will be noted that the pedal pad 1 is turned in position for city driving, with the overhang extending rearwardly, thereby allowing the heel of the driver's shoe to rest on the horizontal portion of the floor 9, and the toe to rest on the pedal pad 1. In Figure 7, the pedal pad is shown in a position reversed with respect to its position in Figure 6, allowing room for the driver to place his foot 11 flat on the inclined portion of the floor 10, between the pedal pad 1 and the line of junction of the horizontal floor board 9 and the inclined floor board 10. To reverse the pedal pad 1 on the pedal 2 all that is necessary is to remove the bolt 4, turn the pedal and insert the bolt again, thus locking the pad 1 in the position desired.

It will be observed that the hole into which the end of the pedal fits, is split on one side, and the bolt 4 passes through the boss on the split side on a line perpendicular to the plane of the split, and also, in a plane perpendicular to the axis of the cooperating end of the pedal. The surface of the bolt intersects the surface of the hole in the pedal pad boss, the end of the pedal being milled out to allow the bolt to pass through the same when the end of the pedal is inserted in the hole, thereby locking the pedal pad to the pedal and preventing the same from turning on, or moving along, its axis. The end or the stem of the pedal has two milled recesses, diametrically opposite each other, thereby enabling the pedal pad to be turned to either position and locked as has been described.

Formal changes may be made in the specific embodiment of the invention described without departing from the spirit or substance of the broad invention, the scope of which is commensurate with the appended claims.

What I claim is:

1. In a motor vehicle, a pedal arm having its outer end at an angle to its base, and a pad eccentrically mounted on said outer end, said pad being rotatably adjustable in a plane perpendicular to the pedal at the point of attachment.

2. In a motor vehicle, a pedal having a pad reversibly and eccentrically mounted thereon; said pad in relation to its point of attachment to said pedal, extending in one position towards the vehicle floor, and in another position away from said floor.

3. In a motor vehicle, a pedal arm secured at one end to a shaft, a pedal pad, a boss on said pedal pad having an opening therein at substantially right angles to the face of said pedal pad, said opening being adapted to receive the free end of said pedal arm, and means to prevent movement of said pedal pad on said pedal arm.

4. In a motor vehicle, a pad eccentrically and rotatably mounted on a pedal, and means for fastening said pad to said pedal in either of two positions, one of which allows the driver's foot to be placed flat on the inclined portion of the floor in line with the pedal, and the other of which allows the driver's heel to rest on the horizontal portion of the floor with his toe on said pad.

5. In a motor vehicle, a pedal pad rotatably adjustable on its pedal, in one position to provide a space for the driver's foot on the inclined portion on the floor substantially in line with the pedal and in another position to facilitate the operation of the pedal while the foot is supported by the adjacent floor board.

6. In a motor vehicle, a rotatable pedal pad in combination with a lever, said pedal pad having an offset boss thereon, said boss having an opening therein whose axis is substantially perpendicular to the face of the pedal pad, and into which the end of the lever extends, and means for locking said pedal pad to said lever to prevent rotation or axial movement thereof.

7. In a motor vehicle, a pedal provided near its outer end and relative to its axial line, with a stem, arranged substantially perpendicular thereto, an offset pedal pad rotatably mounted on the upper end thereof, and means for locking the pedal pad with its center line offset in different angular relations to the axial line of the pedal against relative movement thereto.

8. In a motor vehicle, a rotatable pedal pad in combination with a pedal, said pedal pad embodying an approximately flat face with a split boss on the underside thereof offset from the center of the pedal pad, said split boss having an opening the axis of which is approximately perpendicular to the face of said pedal pad and into which the end of the pedal is adapted to fit, a bolt passing through said split portion of said boss and intersecting the surface of said hole in said boss, two diametrically opposite notches in the end of said pedal enabling said bolt to pass through said split boss when said pedal is inserted therein, thereby locking said pedal pad to the pedal in either of two positions, depending upon which notch is engaged by said bolt, and a nut co-acting with said bolt, capable of drawing said boss around the end of said pedal in close relationship.

Signed by me at Detroit, Michigan, this 29th day of July, 1921.

VINCENT LINK.

Witnesses:
 GEO. R. DAVENPORT,
 HODGSON S. PIERCE.